United States Patent
Jiang et al.

(10) Patent No.: US 11,551,036 B2
(45) Date of Patent: Jan. 10, 2023

(54) METHODS AND APPARATUSES FOR BUILDING DATA IDENTIFICATION MODELS

(71) Applicant: ALIBABA GROUP HOLDING LIMITED, Grand Cayman (KY)

(72) Inventors: Xiaoyan Jiang, Hangzhou (CN); Xu Yang, Hangzhou (CN); Bin Dai, Hangzhou (CN); Wei Chu, Hangzhou (CN)

(73) Assignee: Alibaba Group Holding Limited, Grand Cayman (KY)

(*) Notice: Subject to any disclaimer, the term of this patent is extended or adjusted under 35 U.S.C. 154(b) by 1175 days.

(21) Appl. No.: 16/112,637

(22) Filed: Aug. 24, 2018

(65) Prior Publication Data

US 2018/0365522 A1 Dec. 20, 2018

Related U.S. Application Data

(63) Continuation of application No. PCT/CN2017/073444, filed on Feb. 14, 2017.

(30) Foreign Application Priority Data

Feb. 26, 2016 (CN) .......................... 201610110817.3

(51) Int. Cl.
*G06N 20/00* (2019.01)
*G06K 9/62* (2022.01)
(Continued)

(52) U.S. Cl.
CPC ......... *G06K 9/6257* (2013.01); *G06K 9/6262* (2013.01); *G06K 9/6277* (2013.01);
(Continued)

(58) Field of Classification Search
CPC ........ G06N 20/00; G06N 3/0454; G06N 3/08; G06N 3/02; G06K 9/6257; G06K 9/6262; G06V 10/82
See application file for complete search history.

(56) References Cited

U.S. PATENT DOCUMENTS 7,096,207 B2    8/2006  Kim et al.
2011/0218950 A1* 9/2011  Mirowski ............ A61B 5/7267
                                                   706/58
(Continued)

FOREIGN PATENT DOCUMENTS

CN    101799875 A    8/2010
CN    103902968 A    7/2014
(Continued)

OTHER PUBLICATIONS

SIPO International Search Report issued in International Application No. PCT/CN2017/073444, dated May 8, 2017 (4 pages).
(Continued)

*Primary Examiner* — Li Liu
(74) *Attorney, Agent, or Firm* — Finnegan, Henderson, Farabow, Garrett & Dunner, LLP

(57) ABSTRACT

The present disclosure provides methods and an apparatuses for building a data identification model. One exemplary method for building a data identification model includes: performing logistic regression training using training samples to obtain a first model, the training samples comprising positive and negative samples; sampling the training samples proportionally to obtain a first training sample set; identifying the positive samples using the first model, and selecting a second training sample set from positive samples that have identification results after being identified using the first model; and performing Deep Neural Networks (DNN) training using the first training sample set and the second training sample set to obtain a final data identification model. The methods and the apparatuses of the present disclosure improve the stability of data identification models.

17 Claims, 3 Drawing Sheets

(51) Int. Cl.
    *G06N 3/08*           (2006.01)
    *G06Q 30/06*         (2012.01)
    *G06Q 30/02*         (2012.01)
    *G06Q 30/00*         (2012.01)

(52) U.S. Cl.
    CPC .............. *G06N 3/08* (2013.01); *G06N 20/00* (2019.01); *G06Q 30/018* (2013.01); *G06Q 30/0201* (2013.01); *G06Q 30/06* (2013.01)

(56) References Cited

U.S. PATENT DOCUMENTS

| | | |
|---|---|---|
| 2015/0095017 A1 | 4/2015 | Mnih et al. |
| 2015/0112765 A1* | 4/2015 | Sundaresh ............ G06Q 50/01 |
| | | 705/7.31 |
| 2016/0063993 A1* | 3/2016 | Dolan .................. G06F 40/279 |
| | | 704/254 |
| 2017/0249594 A1* | 8/2017 | Ortigas ............. G06Q 10/1053 |

FOREIGN PATENT DOCUMENTS

| | | | | |
|---|---|---|---|---|
| CN | 104636732 A | 5/2015 | | |
| CN | 104966097 A | 10/2015 | | |
| CN | 105184226 A | 12/2015 | | |
| WO | WO-2017004448 A1 * | 1/2017 | ............ | G06F 19/00 |
| WO | WO 2017/143919 A1 | 8/2017 | | |

OTHER PUBLICATIONS

First Search Report issued in corresponding Chinese Application No. 2016101108173 dated Nov. 25, 2020 (1 page).

\* cited by examiner

METHODS AND APPARATUSES FOR BUILDING DATA IDENTIFICATION MODELS

CROSS-REFERENCE TO RELATED APPLICATIONS

The present disclosure claims priority to International Application No. PCT/CN2017/073444, filed on Feb. 14, 2017, which claims priority to and the benefits of Chinese Patent Application No. 201610110817.3, filed on Feb. 26, 2016, and entitled "METHODS AND APPARATUSES FOR BUILDING DATA IDENTIFICATION MODEL", both of which are incorporated herein by reference in their entireties.

TECHNICAL FIELD

The present disclosure relates to the field of data processing, and in particular, to methods and apparatuses for building data identification models.

BACKGROUND

To determine a behavior pattern by using a machine learning model, common features are generally extracted from various specific behaviors belonging to a certain target behavior, and a machine learning model is constructed according to the common features. The constructed machine learning model determines whether a specific behavior belongs to the target behavior according to whether the specific behavior has the common features.

SUMMARY

According to some embodiments of the present disclosure, methods for building a data identification model are provided. One exemplary method for building a data identification model includes: performing logistic regression training using training samples to obtain a first model, the training samples comprising positive and negative samples; sampling the training samples proportionally to obtain a first training sample set; identifying the positive samples using the first model, and selecting a second training sample set from positive samples that have identification results after being identified using the first model; and performing Deep Neural Networks (DNN) training using the first training sample set and the second training sample set to obtain a final data identification model.

According to some embodiments of the present disclosure, apparatuses for building a data identification model are provided. One exemplary apparatus for building a data identification model includes: a memory storing a set of instructions and a processor. The processor may be configured to execute the set of instructions to cause the apparatus to perform: logistic regression training using training samples to obtain a first model, the training samples comprising positive and negative samples; sampling the training samples proportionally to obtain a first training sample set; identifying the positive samples using the first model, and selecting a second training sample set from positive samples that have identification results after being identified using the first model; and Deep Neural Networks (DNN) training using the first training sample set and the second training sample set to obtain a final data identification model.

According to some embodiments of the present disclosure, a non-transitory computer readable medium that stores a set of instructions that is executable by at least one processor of a computer to cause the computer to perform methods for building a data identification model is provided. One exemplary multi-sampling model training method includes: performing logistic regression training using training samples to obtain a first model, the training samples comprising positive and negative samples; sampling the training samples proportionally to obtain a first training sample set; identifying the positive samples using the first model, and selecting a second training sample set from positive samples that have identification results after being identified using the first model; and performing Deep Neural Networks (DNN) training using the first training sample set and the second training sample set to obtain a final data identification model.

The methods and apparatuses for building a data identification model consistent with the present disclosure perform feature engineering preprocessing and feature screening on all training samples, and according to obtain identification results of a first model obtained by logistic regression training and results of Deep Neural Networks (DNN) training based on a first training sample set, select a second training sample set from all positive samples having identification results to obtain a final data identification model, thus improving the stability of the identification model.

Additional features and advantages of the disclosed embodiments will be set forth in part in the description that follows, and in part will be obvious from the description, or may be learned by practice of the disclosed embodiments. The features and advantages of the disclosed embodiments will be realized and attained by the elements and combinations particularly pointed out in the appended claims.

It is to be understood that both the foregoing general description and the following detailed description are examples and explanatory only and are not restrictive of the disclosed embodiments as claimed.

BRIEF DESCRIPTION OF THE DRAWINGS

The accompanying drawings constitute a part of this specification. The drawings illustrate several embodiments of the present disclosure and, together with the description, serve to explain the principles of the disclosed embodiments as set forth in the accompanying claims.

DETAILED DESCRIPTION

Figure 1:
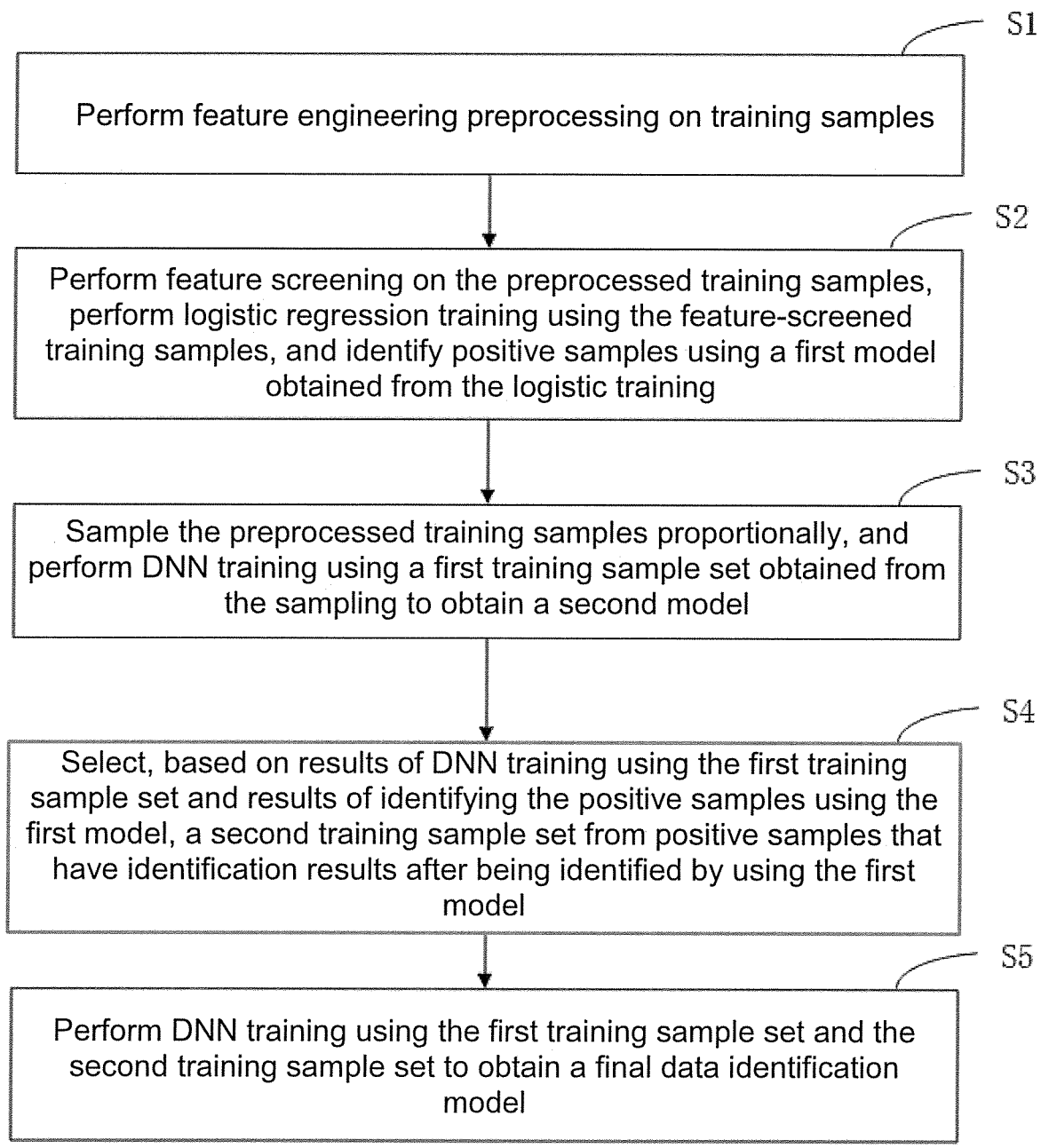
FIG. 1 is a flowchart of an exemplary method for building a data identification model according to some embodiments of the present disclosure.

The technical solution of the present disclosure is described below in further detail with reference to the accompanying drawings and embodiments. The following embodiments do not limit the present disclosure.

The reputation of an online store is an important indicator for online shoppers to decide whether to purchase from the online store. At present, online e-commerce platforms rank online stores according to their reputation levels. The reputation of an online store can be gradually accumulated according to the number of transactions and ratings. A newly opened online store may not have a reputation, and thus its ranking may be lower. Online shoppers are more willing to choose merchants with higher reputations or products with higher sales out of their own rights and interests. The rankings for online stores directly affect whether online shoppers can find the online store. If the online store cannot be found, online shoppers may have more difficulty entering the store to purchase items.

Therefore, it is desirable for online stores to improve their reputations, which has led to the emergence of some websites and individuals that specially improve reputation of online stores through fake transactions, such as brushing. Such fake transactions can harm the healthy development of the online marketplace and impair the protection of online shoppers' rights and interests, and therefore need to be identified and severely punished by e-commerce platforms.

E-commerce platforms, such as Ant Check Later and trust loans of Ant Financial, need to identify whether a transaction is a fake transaction using an identification model obtained through training. Typically, a TOP bad-capture rate is used to evaluate whether an identification of fake transactions is correct. The so-called TOP bad-capture rate, also referred to as a recall rate, refers to a rate of identified fake transactions to the total number of fake transactions. The TOP bad-capture rate is an indicator for evaluating a model obtained by training. Transaction records can be sorted according to the probabilities of fake transactions obtained by model identification, and then the sorted transaction records are divided into groups, and the bad-capture rate of each group can be calculated. If the TOP bad-capture rate remains stable and can meet a predetermined criterion, the model can be determined as reliable and used for subsequent identification of fake transactions.

Currently, when training an identification model, e-commerce platforms, such as ANT FINANCIAL, generally perform feature engineering processing on training samples first, and then train an identification model using a logistic regression algorithm. A bad-capture rate of the obtained model is then obtained using test samples. The bad-capture rate is used to determine whether the identification model obtained by training is reliable.

However, currently the identification model obtained by training is a logistic regression model. Training samples are proportionally sampled, where positive samples are not distinguished. As a result, noise cannot enter the logistic regression algorithm such that the TOP bad-capture rate cannot be improved, and the stability of the model cannot be maintained. Moreover, with the increasing number of the dimensions of fake transaction, a linear model, such as the logistic regression model, cannot learn information of more dimensions and thus lacks adaptability and has limited effects.

Embodiments of the present disclosure provide methods and an apparatuses for building a data identification model to solve the problems of logistic regression models described above. Training of the data identification model can be performed using machine learning methods, such as deep learning method to achieve improved recall rate and more accurate determination of fake transactions judgment.

FIG. 1 is a flowchart of an exemplary method for building a data identification model according to some embodiments of the present disclosure. As shown in FIG. 1, a method for building a data identification model can include the following procedures.

In Step S1, feature engineering preprocessing is performed on training samples. In some instances, some values of the features of the acquired training samples can be missing or the values can have a deviation beyond a normal range, which can affect the subsequent model training. Therefore, feature engineering preprocessing can be performed on the samples. In some embodiments, feature engineering preprocessing is first performed on the samples. For example, data replacement and cleaning can be performed on the features of the samples to eliminate meaningless features. For example, data replacement is performed on missing features in the samples.

In Step S2, feature screening is performed on the preprocessed training samples, logistic regression training is performed by using the feature-screened training samples, and positive samples are identified using a first model obtained from the logistic regression training.

As described herein, the training samples include positive samples and negative samples. For example, with reference to fake transactions, the positive samples refer to fake transaction samples, and the negative samples refer to non-fake transaction samples.

For an identification model, in some instances, some features are not closely correlated with the final identification results. If these features are used as variables, results of identification by the identification model can deteriorate. In other instances, the number of features should normally be less than the number of samples. Therefore, feature screening can be used to screen out features that are not important or even have negative effects. Many suitable methods may be used for feature screening, such as the nearest neighbor algorithm and the partial least square method. In some embodiments, features of the samples are screened based on information values (IVs). For example, samples can be removed when the information value (IV) corresponding to a feature of the sample is less than a predetermined threshold to reduce the influence of such samples on sample distribution.

In some embodiments, information values corresponding to sample features can be obtained according to features of all training samples. It is assumed that features of one training sample may include {feature 1, feature 2, . . . , feature m}, where for feature i, i belongs to (1-m), and m is the number of the features. Information values of all the training samples corresponding to the feature i are {i1, i2, . . . in}, where n is the total number of the training samples.

Then, the samples can be grouped according to the information values of the feature i. For example, samples having information values of the feature i are "a" are classified into one group. As such, the feature i can be divided into K groups. In some embodiments, the information values of the feature i can be obtained according to the following formula.

$$WOE_{ki} = \log\left(\frac{Disgood_{ki}}{Disbad_{ki}}\right)$$

$$IV = \sum_{k=1}^{K}(Disgood_{ki} - Disbad_{ki}) * WOE_{ki}$$

Here, $Disgood_{ki}$ refers to the number of negative samples in a sample group, and $Disbad_{ki}$ refers to the number of positive samples in the sample group. As described herein, which one of $Disgood_{ki}$ and $Disbad_{ki}$ represents the number of negative samples and which one of $Disgood_{ki}$ and $Disbad_{ki}$ represents the number of positive samples are not limited. It is also possible to use $Disgood_{ki}$ to represent the number of positive samples and use $Disbad_{ki}$ to represent the number of negative samples. Thus, features can be screened according to information values corresponding to the features. Features having corresponding information values less than a predetermined threshold are discarded, and features that can affect the identification results are retained for subsequent model training, thus improving the reliability of the training model.

After the feature screening, logistic regression training is performed using the feature-screened training samples to obtain a first model. The present disclosure performs further training based on this first model to obtain a more reliable model. Generally, the first model obtained by performing logistic regression training on the feature-screened training samples is relatively stable, and some of the samples can be selected for subsequent training, such that a model obtained by the subsequent training has better stability. A TOP bad-capture rate is often used as an indicator for evaluating the stability of a model. The TOP bad-capture rate can be obtained from the probabilities of fake transaction obtained by identifying samples using the model.

Consistent with the present disclosure, in some embodiments, the first model obtained by training is used to identify the positive samples to obtain a fake transaction probability corresponding to each training sample. The positive samples and their probabilities obtained by identification are recorded as a training set B (i.e., positive samples that have identification results after being identified using the first model). In some embodiments, in the subsequent step, some training samples are selected from the training set B based on the identification results for use in the subsequent training.

In Step S3, the preprocessed training samples are sampled proportionally, and Deep Neural Networks training is performed using the first training sample set obtained from the sampling to obtain a second model. In some embodiments, to select some training samples from the training set B for use in the subsequent training, samples that have been identified accurately are selected from the training set B to serve as a second training sample set for use in the subsequent training.

In these embodiments, the preprocessed training samples are sampled proportionally to obtain a training set A (e.g., a first training sample set). For example, a ratio of positive samples to negative samples can be 1:10. The positive samples may be selected first, and then a corresponding number of negative samples are selected from the negative samples to keep the ratio at 1:10. Then, Deep Neural Networks (DNN) training is performed using the first training sample set obtained from the sampling to obtain a second model.

In some embodiments, in the subsequent step, a second training sample set is selected from the training set B based on the training results of the second model and the training results of the first model.

It is noted that identification results of the second model are not sufficiently stable. Accordingly, it is appreciated that a final data identification model with good stability can be obtained by training using with the second training sample set in the subsequent step.

In some embodiments, feature engineering preprocessing may be performed on all training samples, and feature screening may be performed to screen out features that are not important or have negative effects on the training results. Both Step S1 and Step S2 are intended to make the model obtained by training more reliable. In some embodiments, feature engineering preprocessing and feature screening are performed on the training samples in both the training for the first model and the training for the second model. In other embodiments, feature screening is performed only in the training for the first model but not performed in the training for the second model. As described herein, the identification results of the model obtained by training can be improved even without the feature engineering preprocessing and feature screening steps.

In Step S4, according to results of DNN training using the first training sample set and results of identifying the positive samples using the first model, a second training sample set is selected from positive samples that have identification results after being identified using the first model. For example, a receiver operating characteristic curve (ROC curve) is a graphical method for showing a True Positive Rate (TPR) and a False Positive Rate (FPR) of a model and is often used to evaluate the effectiveness of the model. Each point on the ROC curve corresponds to three values, which are the TPR, the FPR, and a threshold probability. The TPR refers to a ratio of the number of positive samples predicted to be positive by the model to the actual number of positive samples. The FPR refers to a ratio of the number of negative samples predicted to be positive by the model to the actual number of negative samples. The threshold probability is a determination threshold used to determine that a prediction result is positive. If the prediction result of a sample is greater than the threshold probability, the sample is determined to be positive; otherwise, the sample is determined to be negative. A model with a TPR closer to 1 and an FPR closer to 0 give better prediction results.

In some embodiments, a method for selecting some training samples from the training set B for use in the subsequent training may include the following procedures.

In some embodiments, the method for selecting some training samples from training set B may include evaluating the second model obtained by training and obtaining an ROC curve corresponding to the second model. The method for selecting some training samples from training set B may further include evaluating the first model obtained by training and obtaining an ROC curve corresponding to the first model. The method for selecting some training samples from training set B may also include selecting, based on a threshold probability corresponding to an intersection point of the ROC curves of the first model and the second model, samples having probabilities less than the threshold probability from the training set B to serve as the second training sample set.

As described herein, the number of the samples in the selected second training sample set can be less than the number of the positive samples in the first training sample set. For example, the samples in the selected second training sample set are not more than the positive samples in the first training sample set. This allows for obtaining a desired ratio of positive samples to negative samples and prevents the deterioration of the effectiveness of the model due to too many positive samples.

In some embodiments, in the selection of the second training set, a predetermined number of samples can be selected from the training set B to serve as the second training set based on probabilities obtained from model evaluation in descending order. In other embodiments, a threshold may be set based on experience, and samples having probabilities greater than the threshold are selected from the training set B to serve as the second training set. In some embodiments, samples are selected based on an intersection point of the ROC curves to obtain better results in the subsequent training.

Figure 2:
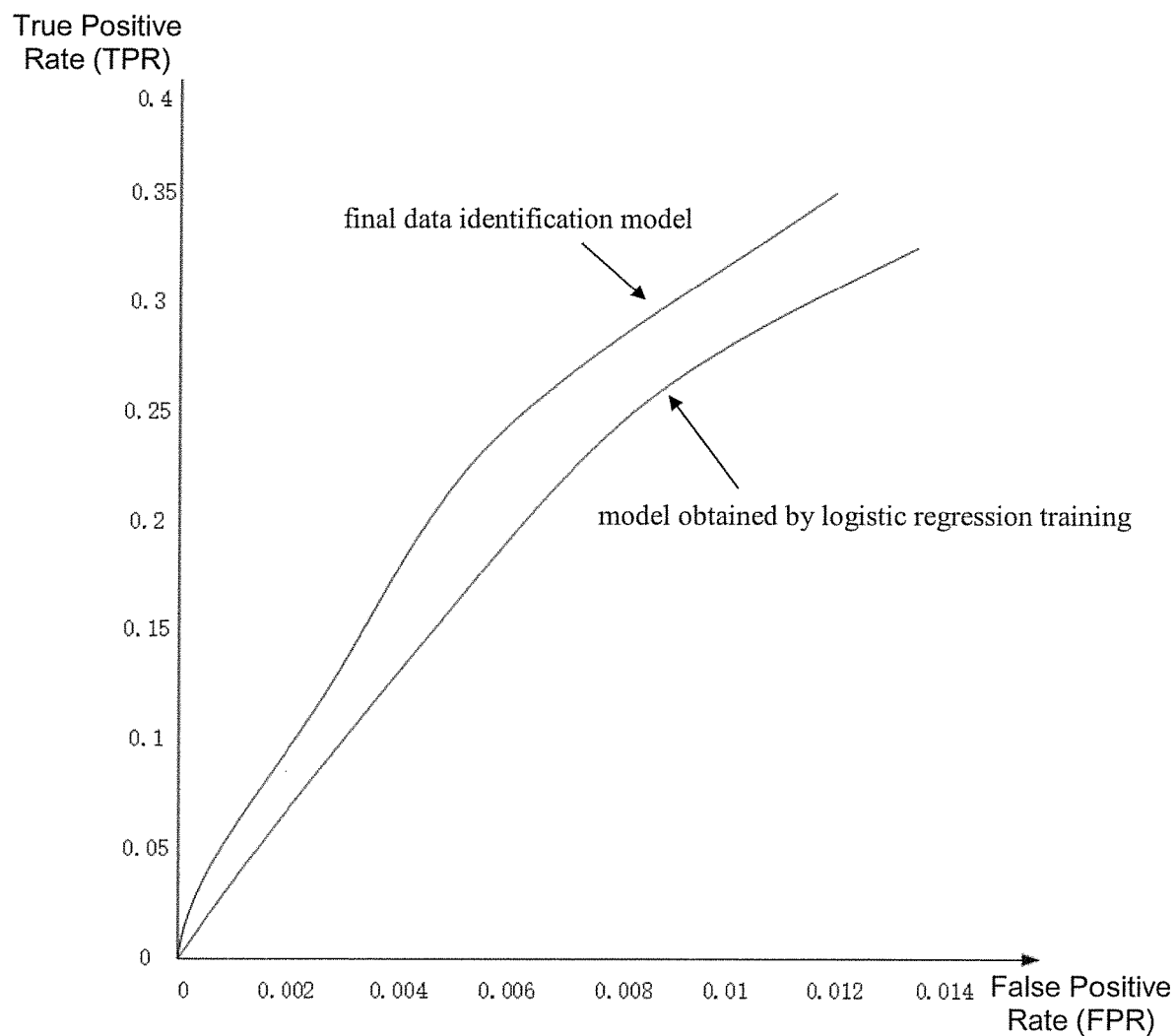
FIG. 2 is a schematic diagram comparing performance of data identification models according to some embodiments of the present disclosure.

In Step S5, DNN training is performed using the first training sample set and the second training sample set to obtain a final data identification model. As described herein, any suitable DNN training method may be used. The upper curve in FIG. 2 is an ROC curve corresponding to the final data identification model obtained by training in Step S5, and the lower curve is an ROC curve corresponding to the first model obtained by logistic regression training. As demonstrated by the ROC curves shown in FIG. 2, the final data identification model obtained by training performs much better than the first model obtained by logistic regression training.

From obtaining the TOP bad-capture rate of the final data identification model, it can be found that embodiments of the method for building a data identification model consistent with the present disclosure greatly improves the stability of the built model.

Figure 3:
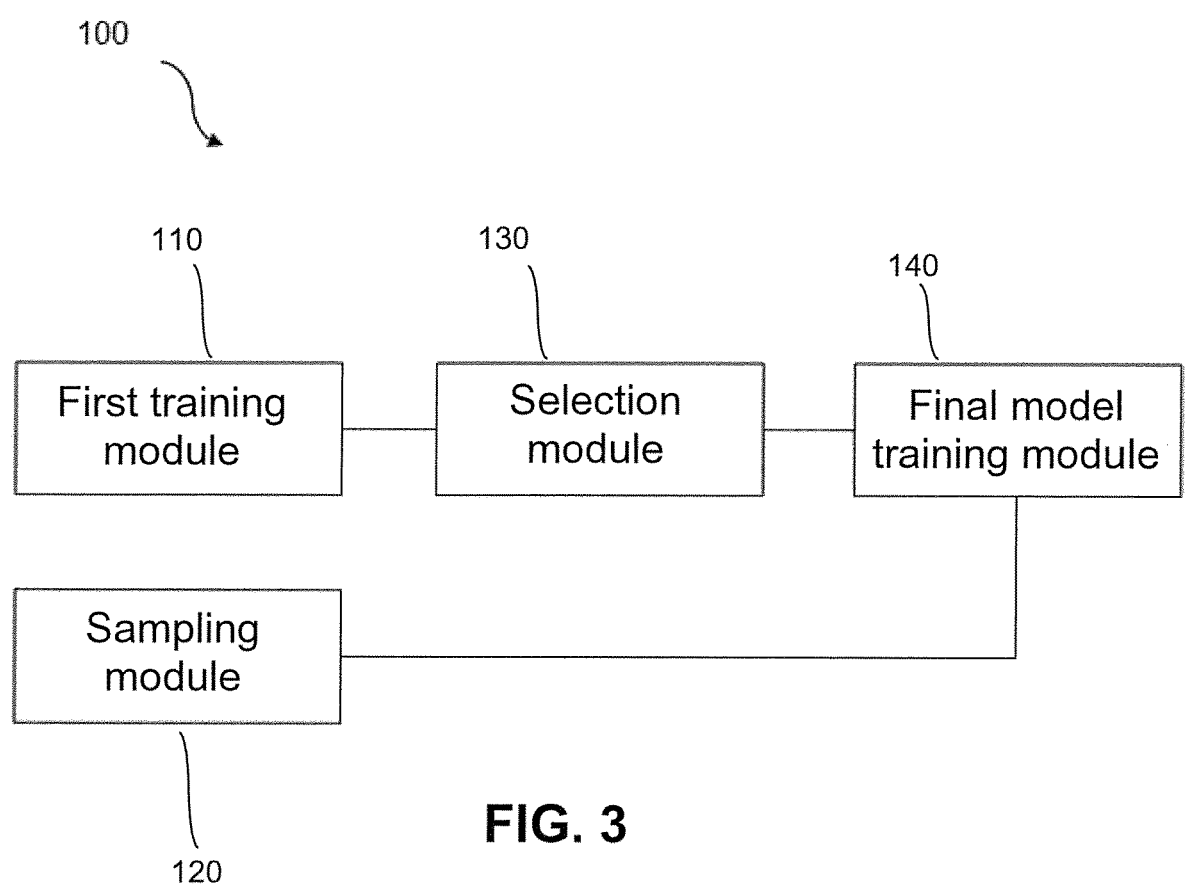
FIG. 3 is a schematic structural diagram of an exemplary apparatus for building a data identification model according to some embodiments of the present disclosure.

FIG. 3 is a schematic structural diagram of an exemplary apparatus for building a data identification model according to some embodiments of the present disclosure. As shown in FIG. 3, an exemplary apparatus 100 for building a data identification model may include a first training module 110, a sampling module 120, a selection module 130, and a final model training module 140. The exemplary apparatus may build one or more data identification models using training samples that include positive and negative samples.

First training module 110 can be configured to perform logistic regression training using the training samples to obtain a first model.

Sampling module 120 can be configured to sample the training samples proportionally to obtain a first training sample set.

Selection module 130 can be configured to identify positive samples using the first model, and select a second training sample set from positive samples that have identification results after being identified using the first model.

Final model training module can be configured to perform Deep Neural Networks (DNN) training using the first training sample set and the second training sample set to obtain a final data identification model.

Embodiments of the exemplary apparatus 100 may further include a preprocessing module, a feature screening module, and a second training module.

The preprocessing module can be configured to perform feature engineering preprocessing on the training samples before sampling or logistic regression training is performed.

The feature screening module can be configured to perform feature screening on the training samples before logistic regression training is performed. The feature screening module may perform feature screening to remove features having information values less than a predetermined threshold.

The second training module can be configured to perform DNN training using the first training sample set to obtain a second model.

In some embodiments, to select a second training sample set from positive samples that have identification results after being identified using the first model, the selection module can be further configured to perform the following procedures.

In some embodiments, the selection module can be further configured to evaluate the first model and to obtain an ROC curve corresponding to the first model.

In some embodiments, the selection module can be further configured to evaluate the second model and to obtain an ROC curve corresponding to the second model.

In some embodiments, the selection module can be further configured to select, based on a threshold probability corresponding to an intersection point of the ROC curves of the first model and the second model, samples having probabilities less than the threshold probability from the positive samples that have identification results after being identified using the first model to serve as the second training sample set.

The foregoing embodiments are merely used to illustrate the technical solution of the present disclosure and are not intended to limit the present disclosure. Without departing from the spirit and the essence of the present disclosure, those skilled in the art can make various changes and modifications consistent with the present disclosure. Such changes and modifications shall fall within the protective scope of the present disclosure.

The present disclosure may be described in a general context of computer-executable commands or operations, such as a program module, stored on a computer-readable medium and executed by a computing device or a computing system, including at least one of a microprocessor, a processor, a central processing unit (CPU), a graphical processing unit (GPU), etc. In general, the program module may include routines, procedures, objects, components, data structures, processors, memories, and the like for performing specific tasks or implementing a sequence of steps or operations.

Embodiments of the present disclosure may be embodied as a method, an apparatus, a device, a system, a computer program product, etc. Accordingly, embodiments of the present disclosure may take the form of an entirely hardware embodiment, an entirely software embodiment, or an embodiment combining software and hardware for allowing a specialized device having the described specialized components to perform the functions described above.

Furthermore, embodiments of the present disclosure may take the form of a computer program product embodied in one or more computer-readable storage media that may be used for storing computer-readable program codes. Based on such an understanding, the technical solutions of the present disclosure can be implemented in a form of a software product. The software product can be stored in a non-volatile storage medium (which can be a CD-ROM, a USB flash memory, a mobile hard disk, and the like). The storage medium can include a set of instructions for instructing a computer device (which may be a personal computer, a server, a network device, a mobile device, or the like) or a processor to perform a part of the steps of the methods provided in the embodiments of the present disclosure. The foregoing storage medium may include, for example, any medium that can store a program code, such as a USB flash disk, a removable hard disk, a Read-Only Memory (ROM), a Random-Access Memory (RAM), a magnetic disk, or an optical disc. The storage medium can be a non-transitory computer-readable medium. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM any other memory chip or cartridge, and networked versions of the same.

It should be noted that, the relational terms such as "first" and "second" are only used to distinguish an entity or operation from another entity or operation, and do necessarily require or imply that any such actual relationship or order exists among these entities or operations. It should be further noted that, as used in this specification and the appended claims, the singular forms "a," "an," and "the," and any singular use of any word, include plural referents unless expressly and unequivocally limited to one referent. As used herein, the terms "include," "comprise," and their grammatical variants are intended to be non-limiting, such that recitation of items in a list is not to the exclusion of other like items that can be substituted or added to the listed items. The term "if" may be construed as "at the time of," "when," "in response to," or "in response to determining."

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

This description and the accompanying drawings that illustrate exemplary embodiments should not be taken as limiting. Various structural, electrical, and operational changes may be made without departing from the scope of this description and the claims, including equivalents. In some instances, well-known structures and techniques have not been shown or described in detail so as not to obscure the disclosure. Similar reference numbers in two or more figures represent the same or similar elements. Furthermore, elements and their associated features that are disclosed in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A method for building a data identification model, comprising:
    performing logistic regression training using training samples to obtain a first model, the training samples comprising positive samples and negative samples;
    sampling the training samples proportionally to obtain a first training sample set;
    identifying the positive samples using the first model, and selecting a second training sample set from positive samples that have identification results after being identified using the first model; and
    performing Deep Neural Networks (DNN) training using the first training sample set and the second training sample set to obtain a final data identification model.

2. The method for building a data identification model of claim 1, wherein prior to sampling the training samples proportionally or performing logistic regression training, the method further comprises:
    performing feature engineering preprocessing on the training samples.

3. The method for building a data identification model of claim 2, wherein prior to performing logistic regression training using the training samples to obtain a first model, the method further comprises:
    performing feature screening on the training samples to remove features having information values that satisfy a predetermined threshold condition.

4. The method for building a data identification model of claim 1, wherein prior to selecting the second training sample set from positive samples that have identification results after being identified using the first model, the method further comprises:
    performing DNN training using the first training sample set to obtain a second model.

5. The method for building a data identification model of claim 4, wherein selecting the second training sample set from positive samples that have identification results after being identified using the first model further comprises:
    evaluating the first model and obtaining an ROC curve corresponding to the first model;
    evaluating the second model and obtaining an ROC curve corresponding to the second model; and
    selecting, based on a threshold probability corresponding to an intersection point of the ROC curves of the first model and the second model, samples having probabilities satisfying a threshold probability condition from positive samples that have identification results after being identified using the first model to serve as the second training sample set.

6. An apparatus for building a data identification model, comprising:
    a memory storing a set of instructions; and
    a processor configured to execute the set of instructions to cause the apparatus to perform:
        logistic regression training using training samples to obtain a first model, the training samples comprising positive samples and negative samples;
        sampling the training samples proportionally to obtain a first training sample set;
        identifying the positive samples using the first model, and selecting a second training sample set from positive samples that have identification results after being identified using the first model; and
        Deep Neural Networks (DNN) training using the first training sample set and the second training sample set to obtain a final data identification model.

7. The apparatus for building a data identification model of claim 6, wherein the processor is configured to execute the set of instructions to cause the apparatus to further perform:
    prior to sampling the training samples proportionally or performing logistic regression training, feature engineering preprocessing on the training samples.

8. The apparatus for building a data identification model of claim 7, wherein the processor is configured to execute the set of instructions to cause the apparatus to further perform:
    prior to performing logistic regression training using the training samples to obtain a first model, feature screening on the training samples to remove features having information values that satisfy a predetermined threshold condition.

9. The apparatus for building a data identification model of claim 6, wherein the processor is configured to execute the set of instructions to cause the apparatus to further perform:
DNN training using the first training sample set to obtain a second model.

10. The apparatus for building a data identification model of claim 9, wherein selecting the second training sample set from positive samples that have identification results after being identified using the first model further comprises:
evaluating the first model and obtaining an ROC curve corresponding to the first model;
evaluating the second model and obtaining an ROC curve corresponding to the second model; and
selecting, based on a threshold probability corresponding to an intersection point of the ROC curves of the first model and the second model, samples having probabilities satisfying a threshold probability condition from positive samples that have identification results after being identified using the first model to serve as the second training sample set.

11. A non-transitory computer readable medium that stores a set of instructions that is executable by at least one processor of a computer to cause the computer to perform a method for building a data identification model, the method comprising:
performing logistic regression training using training samples to obtain a first model, the training samples comprising positive samples and negative samples;
sampling the training samples proportionally to obtain a first training sample set;
identifying the positive samples using the first model, and selecting a second training sample set from positive samples that have identification results after being identified using the first model; and
performing Deep Neural Networks (DNN) training using the first training sample set and the second training sample set to obtain a final data identification model.

12. The non-transitory computer readable medium of claim 11, wherein the processor is configured to execute the set of instructions to cause the computer to further perform:
prior to sampling the training samples proportionally or performing logistic regression training, feature engineering preprocessing on the training samples.

13. The non-transitory computer readable medium of claim 12, wherein the processor is configured to execute the set of instructions to cause the computer to further perform:
prior to performing logistic regression training using the training samples to obtain a first model, feature screening on the training samples to remove features having information values that satisfy a predetermined threshold condition.

14. The non-transitory computer readable medium of claim 13, wherein the predetermined threshold condition is satisfied when the features have information values less than a predetermined threshold.

15. The non-transitory computer readable medium of claim 11, wherein the processor is configured to execute the set of instructions to cause the computer to further perform:
DNN training using the first training sample set to obtain a second model.

16. The non-transitory computer readable medium of claim 15, selecting the second training sample set from positive samples that have identification results after being identified using the first model further comprises:
evaluating the first model and obtain an ROC curve corresponding to the first model;
evaluating the second model and obtain an ROC curve corresponding to the second model; and
selecting, based on a threshold probability corresponding to an intersection point of the ROC curves of the first model and the second model, samples having probabilities satisfying a threshold probability condition from positive samples that have identification results after being identified using the first model to serve as the second training sample set.

17. The non-transitory computer readable medium of claim 16, wherein the threshold probability condition is satisfied when the samples have probabilities less than a threshold probability.

* * * * *